(12) United States Patent
Cho et al.

(10) Patent No.: US 11,888,172 B2
(45) Date of Patent: Jan. 30, 2024

(54) BATTERY PACK INCLUDING OBLIQUE BATTERY CELLS

(71) Applicant: SAMSUNG SDI CO., LTD., Yongin-si (KR)

(72) Inventors: Kyungho Cho, Yongin-si (KR); Jaehoon Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 374 days.

(21) Appl. No.: 17/146,667

(22) Filed: Jan. 12, 2021

(65) Prior Publication Data

US 2021/0218104 A1    Jul. 15, 2021

(30) Foreign Application Priority Data

Jan. 13, 2020  (KR) .................... 10-2020-0004307

(51) Int. Cl.
| | |
|---|---|
| *H01M 50/291* | (2021.01) |
| *H01M 10/613* | (2014.01) |
| *H01M 10/6557* | (2014.01) |
| *H01M 50/264* | (2021.01) |
| *H01M 50/30* | (2021.01) |
| *H01M 50/35* | (2021.01) |

(Continued)

(52) U.S. Cl.
CPC ....... *H01M 50/291* (2021.01); *H01M 10/613* (2015.04); *H01M 10/6557* (2015.04); *H01M 50/207* (2021.01); *H01M 50/264* (2021.01); *H01M 50/35* (2021.01); *H01M 50/394* (2021.01); *H01M 50/552* (2021.01)

(58) Field of Classification Search
CPC ............ H01M 50/291; H01M 50/264; H01M 50/394; H01M 50/35; H01M 50/552; H01M 50/207; H01M 10/613; H01M 10/6557

See application file for complete search history.

(56) References Cited

U.S. PATENT DOCUMENTS

| | | |
|---|---|---|
| 7,662,508 B2 | 2/2010 | Lee et al. |
| 10,873,114 B2 | 12/2020 | Ju et al. |

(Continued)

FOREIGN PATENT DOCUMENTS

| | | | | |
|---|---|---|---|---|
| DE | 102015214185 A1 | * | 2/2017 | |
| EP | 1089373 A1 | * | 4/2001 | .......... H01M 10/613 |

(Continued)

OTHER PUBLICATIONS

European Search Report dated Oct. 4, 2021.
European Partial Search Report.

*Primary Examiner* — Jimmy Vo
(74) *Attorney, Agent, or Firm* — Lee IP Law, P.C.

(57) ABSTRACT

A battery pack including a plurality of battery cells arranged in a row in a first direction, the plurality of battery cells being arranged obliquely with respect to the first direction; a first holder plate and a second holder plate arranged to face each other and support the plurality of battery cells therebetween, the first holder plate including a plurality of first steps repeatedly arranged to surround and support first vertically protruding edges of the plurality of battery cells and the second holder plate including a plurality of second steps repeatedly arranged to surround and support second vertically protruding edges of the plurality of battery cells; and at least one cooling channel in the first steps.

27 Claims, 13 Drawing Sheets

(51) Int. Cl.
*H01M 50/552* (2021.01)
*H01M 50/207* (2021.01)

(56) References Cited

U.S. PATENT DOCUMENTS

2003/0232239 A1* 12/2003 Gow .................. H01M 50/278
 429/153
2005/0147874 A1 7/2005 Andersen et al.
2013/0130080 A1 5/2013 Yoon et al.
2016/0064708 A1 3/2016 Miller
2018/0040862 A1 2/2018 Yi

FOREIGN PATENT DOCUMENTS

| JP | 2015-018643 A | 1/2015 | |
|---|---|---|---|
| KR | 10-0627394 B1 | 9/2006 | |
| KR | 10-2018-0015494 A | 2/2018 | |
| KR | 10-2018-0074133 A | 7/2018 | |
| WO | WO-2010148224 A2 * | 12/2010 | ........ H01M 10/5057 |
| WO | WO 2016-147280 A1 | 9/2016 | |
| WO | WO 2017-217313 A1 | 12/2017 | |

* cited by examiner

BATTERY PACK INCLUDING OBLIQUE BATTERY CELLS

CROSS-REFERENCE TO RELATED APPLICATION

Korean Patent Application No. 10-2020-0004307, filed on Jan. 13, 2020, in the Korean Intellectual Property Office, and entitled: "Battery Pack," is incorporated by reference herein in its entirety.

BACKGROUND

1. Field

Embodiments relate to a battery pack.

2. Description of Related Art

A secondary battery is a battery capable of charging and discharging, unlike a primary battery that cannot be recharged. A secondary battery may be used as an energy source for mobile devices, electric vehicles, hybrid vehicles, electric bicycles, and uninterruptible power supplies, may be used in the form of a single battery depending on the type of applied external appliances, and may also be used in the form of a module in which a number of batteries are connected and grouped into one unit.

Small mobile appliances such as mobile phones may operate for a predetermined period of time with the power and capacity of a single battery, in the case where electric vehicles and hybrid vehicles having high power consumption require long-term and high-power driving, module-type secondary batteries including a large number of batteries is preferred due to the problems of output and capacity, and output voltages or output currents may be increased depending on the number of built-in batteries.

SUMMARY

The embodiments may be realized by providing a battery pack including a plurality of battery cells arranged in a row in a first direction, the plurality of battery cells being arranged obliquely with respect to the first direction; a first holder plate and a second holder plate arranged to face each other and support the plurality of battery cells therebetween, the first holder plate including a plurality of first steps repeatedly arranged to surround and support first vertically protruding edges of the plurality of battery cells and the second holder plate including a plurality of second steps repeatedly arranged to surround and support second vertically protruding edges of the plurality of battery cells; and at least one cooling channel in the first steps.

Each of the battery cells may include a terminal surface including a terminal; a bottom surface opposite to the terminal surface; a first main surface and a second main surface, the first and second main surfaces connecting the terminal surface and the bottom surface and each having a first area; and a pair of side surfaces connecting the terminal surface and the bottom surface, the side surfaces each having a second area that is smaller than the first area.

The first holder plate may support the bottom surface and the first main surface around a corresponding one of the first vertically protruding edges where the bottom surface and the first main surface of the battery cell meet.

The first steps may each include a first portion supporting the bottom surface of one battery cell, and a second portion supporting the first main surface of another, adjacent battery cell.

The at least one cooling channel may be between the first portion and the second portion of the first step.

The first steps may each include a first hollow portion having an empty inner portion at a position adjacent to the at least one cooling channel.

The at least one cooling channel may include a plurality of cooling channels respectively in each of the first steps.

The plurality of cooling channels may be connected in parallel such that inlets and outlets of respective cooling channels are fluidly connected to each other.

The inlets of the plurality of cooling channels may be connected to a cooling medium supply pipe through a distributor.

The cooling medium supply pipe may form a flow path that directs a cooling medium in a direction opposite to a flow direction of the cooling medium in the plurality of cooling channels, and the cooling medium supplied from the cooling medium supply pipe may be distributed to each of the cooling channels as the flow direction is changed in the distributor.

The first holder plate may further include the cooling medium supply pipe and a second hollow portion surrounding the cooling medium supply pipe.

The outlets of the plurality of cooling channels may be connected to a main outlet through which a cooling medium is discharged through a collector connected to the outlets of the plurality of cooling channels.

Each of the battery cells may further include a vent for relieving inner pressure of the battery cells, and the second holder plate may further include a vent hole in the second steps at a position corresponding to the vent of the battery cell.

Each battery cell may include a terminal surface including a terminal; a bottom surface opposite to the terminal surface; a first main surface and a second main surface, the first and second main surfaces connecting the terminal surface and the bottom surface and each having a first area; and a pair of side surfaces connecting the terminal surface and the bottom surface, the side surfaces each having a second area that is smaller than the first area, and the second steps may each include a first portion supporting the terminal surface of one battery cell, and a second portion supporting the second main surface of another, adjacent battery cell.

The vent hole may be in the first portion of the second step.

The second steps may each further include an accommodation space for receiving exhaust gas discharged through the vent hole, the accommodation space being an inner space of the second step.

The battery pack may further include at least one exhaust channel fluidly connected to the accommodation space and providing a discharge path for exhaust gas, the at least one exhaust channel extending across a plurality of the accommodation spaces.

The at least one exhaust channel may include a first exhaust channel and a second exhaust channel at opposite sides of the plurality of the accommodation spaces.

The plurality of the accommodation spaces may include first and second accommodation spaces arranged alternately along a horizontal direction, the first accommodation space may be fluidly connected to the first exhaust channel, and the second accommodation space may be fluidly connected to the second exhaust channel.

The battery pack may further include a partition wall between the first and second accommodation spaces and partitioning the first and second accommodation spaces from each other.

The partition wall may be at one side of the first portion of the second steps, and not at a side of the first portion that includes the vent hole.

The partition wall may be a hollow structure having an empty inner portion.

In the partition wall, a wall body at a side opposite to a connection hole connecting the accommodation space and the exhaust channel may include a rounded portion.

The first and second holder plates may be coupled to each other with a fastener configured to fasten the first and second holder plates in directions facing each other with the plurality of battery cells therebetween.

The fastener may be fastened to the first and second holder plates at positions corresponding to the first vertically protruding edges and the second vertically protruding edges of the plurality of battery cells.

The first vertically protruding edges and the second vertically protruding edges of the plurality of battery cells may be aligned along a second direction perpendicular to the first direction.

The battery cells may be arranged in a plurality of rows such that rows of battery cells each including a plurality of battery cells are spaced parallel to each other, the first and second holder plates may further include a plurality of step portions extending in parallel in a horizontal direction so as to be spaced apart from each other in correspondence with a plurality of rows of battery cells, and a fastening portion formed flat between the adjacent step portions, and the fastener may be fastened to the fastening portion.

Each of the step portions of the first and second holder plates may include a plurality of repeatedly arranged first and second steps.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
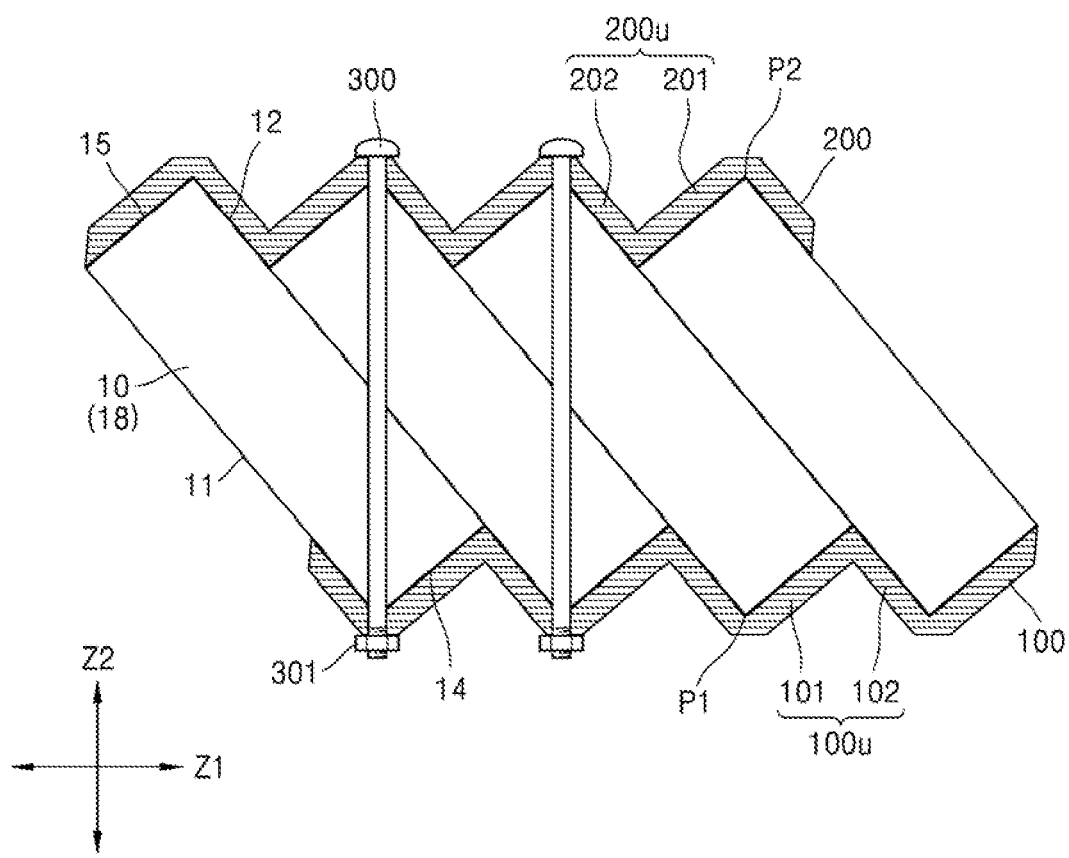
FIG. 1 illustrates a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" are not exclusive terms, and include any and all combinations of one or more of the associated listed items. Expressions such as "at least one of," when preceding a list of elements, modify the entire list of elements and do not modify the individual elements of the list.

Hereinafter, a battery pack according to embodiments of the present disclosure will be described with reference to the accompanying drawings.

Figure 2:
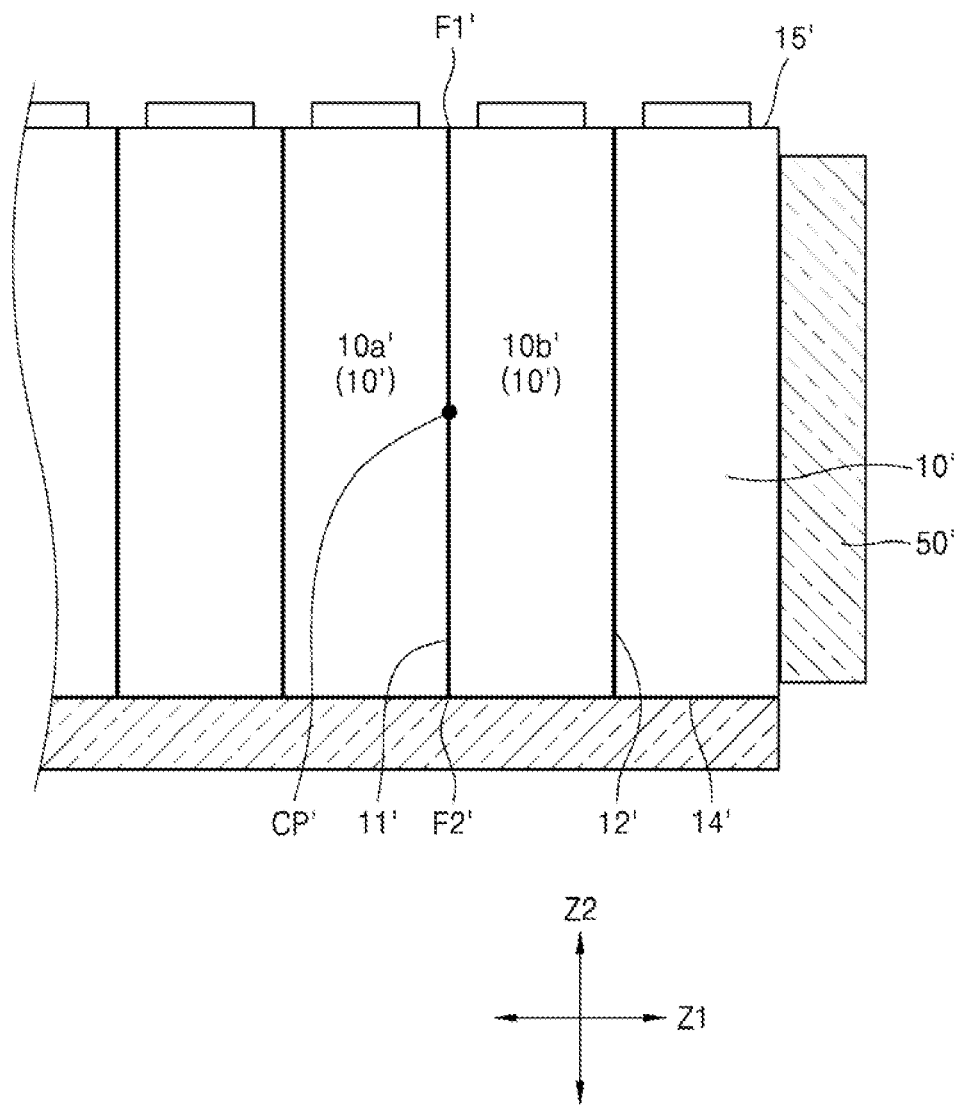
FIG. 2 illustrates a battery pack according to a comparative example for comparison with the present disclosure.

FIG. 1 illustrates a battery pack according to an embodiment. FIG. 2 illustrates a battery pack according to a comparative example for comparison with the present disclosure.

Referring to FIG. 1, a battery pack according to an embodiment may include a battery cell 10 (e.g., a plurality of battery cells 10), a first holder plate 100 supporting or holding both a bottom surface 14 and a first main surface 11 of the battery cell 10, and a second holder plate 200 supporting or holding a terminal surface 15 and second main surface 12 of the battery cell 10. As will be described below, the first and second holder plates 100 and 200 may be coupled to each other through a fastener 300 for fastening the first and second holder plates with each other in a direction facing each other in a state where the battery cell 10 is between the first and second holder plates 100 and 200.

The battery cell 10 may include the terminal surface 15 (provided with a terminal), the bottom surface 14 facing, e.g., opposite to, the terminal surface 15, relatively larger-area main surfaces 11 and 12 connecting the terminal surface 15 and the bottom surface 14, and relatively smaller-area side surfaces 18 connecting the terminal surface 15 and the bottom surface 14. The terminal surface 15 may be provided with first and second terminals having opposite polarities to each other. The main surfaces 11 and 12 may include first and second main surfaces 11 and 12 facing each other. Each of the main surfaces 11 and 12 may have a relatively larger area than each of the terminal surface 15, bottom surface 14, and side surfaces 18 of the battery cell 10, e.g., may have the largest area among the surfaces of the battery cell 10.

The battery cell 10 may be obliquely disposed. In an implementation, the oblique disposition of the battery cell 10 refers to, when the battery cells 10 adjacent to each other face each other, these battery cells 10 face each other through only a part of each of the main surfaces 11 and 12 and do not face each other through each of the entirety of the main surfaces 11 and 12. In an implementation, a part of each of the main surfaces 11 and 12 facing each other of the adjacent battery cells 10 may not correspond to or be aligned with one end and the other end of each of the main surfaces 11 and 12 of the battery cell 10, but rather may correspond to an intermediate region between one end and the other end. In an implementation, the battery cells 10 adjacent to each other may face each other through the intermediate regions of the main surfaces 11 and 12. In this case, the area of the main surfaces 11 and 12 of the adjacent battery cells 10 that overlap (e.g., contact) each other, may be less than the total area of the respective main surfaces 11 and 12. In an implementation, the battery cells 10 may be tilted or inclined at an angle so that main surfaces 11 and 12 of adjacent battery cells 10 do not completely align or overlap one another.

In an implementation, the oblique disposition of the battery cells 10 may mean that the terminal surface 15, bottom surface 14, and main surfaces 11 and 12 of the battery cells 10 have an inclination (e.g., are inclined at an angle) with respect to a horizontal direction Z1, e.g., corresponding to a column or arrangement direction of the battery cells 10 (a line passing through the aligned battery cells 10). In an implementation, when the main surfaces 11 and 12 may have an inclination with respect to the horizontal direction Z1, the battery cells 10 may be obliquely arranged. In an implementation, in the battery cell 10 that obliquely disposed, a first edge P1 (formed by of where the bottom surface 14 and the first main surface 11 meet) and a second edge P2 (formed by or where the terminal surface 15 and the second main surface 12 meet) may form a lowermost portion and an uppermost portion of the battery cell 10, respectively, along a vertical direction Z2. For reference, as used herein, the horizontal direction Z1 may refer to a direction in which a plurality of battery cells 10 are arranged or a column direction of the battery cell 10, and the vertical direction Z2 may refer to a direction perpendicular to the horizontal direction Z1. In an implementation, the vertical direction Z2 may refer to an extension (e.g., lengthwise) direction of the fastener 300 that fastens the first and second holder plates 100 and 200 in a direction opposite to each other.

In the inclined arrangement structure of the battery cells 10 according to an embodiment, the height of the entire battery pack (e.g., in the vertical direction Z2) may be lowered (e.g., may be less than a distance between the bottom surface 14 and the terminal surface 15 of the battery cell 10), thereby providing a battery pack that advantageously is slim in height. In an implementation, the height of the battery pack may depend on the height of the battery cell 10, and in this case, the height of the battery cell 10 may be correspond to a height or distance between the first and second edges P1 and P2 (in the vertical direction Z2) forming the lowermost and uppermost portions of the battery cell 10. As shown in FIG. 2, in an upright arrangement structure of battery cells 10' according to a comparative example for comparison with the present disclosure, the height of the battery pack may correspond to a height or distance between the terminal surface 15' and bottom surface 14' of the battery cell 10'. The height of the upright battery cell 10' may be higher than the height of the battery cell 10 in the inclined arrangement structure, e.g., the height between the first and second edges P1 and P2, thereby increasing the overall height of the entire battery pack.

Referring to FIG. 1, the first edge P1 may protrude in the vertical direction Z2 to form the lowermost portion of the battery cell 10 and may be surrounded and pressed by the first holder plate 100, and the bottom surface 14 and the first main surface 11 may be supported by the first holder plate 100 based on or around the first edge P1. In an implementation, the second edge P2 may protrude in the vertical direction Z2 to form the uppermost portion of the battery cell 10 and may be surrounded and pressed by the second holder plate 200, and the terminal surface 15 and the second main surface 12 may be supported by the second holder plate 200 based on or around the second edge P2. The support structure of the battery cell 10 by the first and second holder plates 100 and 200 will be described in detail below.

The first holder plate 100 may support both the bottom surface 14 and (e.g., a part of the) first main surface 11 of the battery cell 10. In an implementation, the first holder plate 100 may support the bottom surface 14 and first main surface 11 of the battery cell 10 based on or around the first edge P1 formed by the bottom surface 14 and first main surface 11 of the battery cell 10. In this case, the first holder plate 100 may support the entire bottom surface 14 and a part of the first main surface 11 based on or along the first edge P1. The first holder plate 100 may be formed in a step shape, e.g., may be formed in a repeating step shape to form a sawtooth shape.

In an implementation, the first holder plate 100 may include a plurality of first steps 100u formed in a wedge shape, and may be formed in a pattern in which the plurality of first steps 100u are repeated. The first step 100u may support the bottom surface 14 of one battery cell 10 and the first main surface 11 of another, adjacent battery cell 10. In an implementation, the first step 100u may include a first portion 101 supporting the bottom surface 14 of one battery cell 10, and a second portion 102 supporting the first main surface 11 of the other, adjacent battery cell 10.

In an implementation, the first holder plate 100 may be formed in a zigzag bent plate shape to follow a step shape stepped along a sawtooth shape. In an implementation, an inner surface of the first holder plate 100 (e.g., facing toward the battery cell 10) and an outer surface thereof (e.g., facing opposite to or away from the battery cell 10) may be formed in substantially the same sawtooth shape. In an implementation, the inner and outer surfaces of the first holder plate 100 may be formed in shapes that are not aligned or correspond with each other. In an implementation, the inner surface of the first holder plate 100 may be formed in a step shape stepped along a sawtooth shape, and the outer surface of the first holder plate 100 may be formed in a flat shape.

Figure 6:
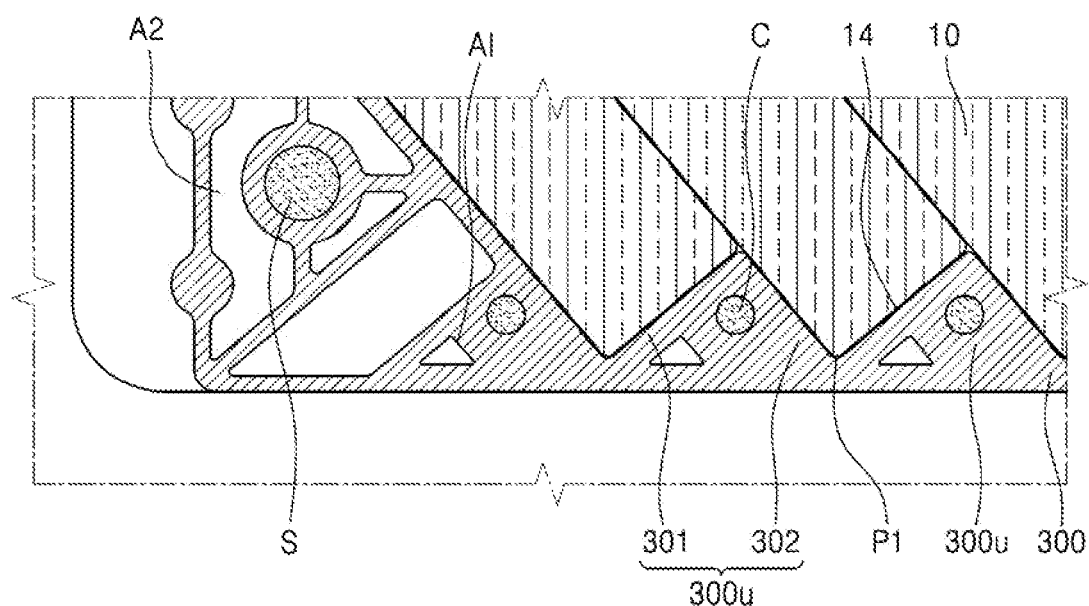
FIGS. 6 and 7 illustrate different views of a cooling structure according to an embodiment.
Figure 6:
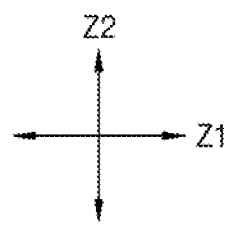

In an implementation, as illustrated in FIG. 6, the inner surface of a first holder plate 300 may be formed in a step shape stepped along a sawtooth shape, and the outer surface of the first holder plate 300 may be formed in a flat shape. In an implementation, the first holder plate 300 may provide an assembly surface or a mounting surface of a battery pack for an electric vehicle mounted with the battery pack, and in order to stably support the battery pack, at least a part of the outer surface of the first holder plate 300 may be formed in a flat shape, rather than a step shape. In an implementation, a flat leg structure for supporting the entire battery pack may be formed at at least some positions along the outer surface of the first holder plate 300.

Referring to FIG. 1, the second holder plate 200 may support both the terminal surface 15 and second main surface 12 of the battery cell 10. In an implementation, the second holder plate 200 may support the terminal surface 15 and second main surface 12 of the battery cell 10 based on or around the second edge P2 formed by the terminal surface 15 and second main surface 12 of the battery cell 10. In an implementation, the second holder plate 200 may support the entire terminal surface 15 and a part of the second main surface 12 based on or around the second edge P2. The second holder plate 200 may be formed in a step shape, e.g., may be formed in a step shape stepped along a sawtooth shape.

In an implementation, the second holder plate 200 may include a plurality of second steps 200u formed in a wedge shape, and may be formed in a pattern in which the plurality of second steps 200u are repeated. The second step 200u may support the terminal surface 15 of one battery cell 10 and the second main surface 12 of another, adjacent battery cell 10. In an implementation, the second step 200u may include a first portion 201 supporting the terminal surface 15 of one battery cell 10, and a second portion 202 supporting the second main surface 12 of the other adjacent battery cell 10.

In an implementation, the second holder plate 200 may be formed in a zigzag bent plate shape to follow a step shape stepped along a sawtooth shape. In an implementation, an inner surface of the second holder plate 200 (facing the battery cell 10) and an outer surface thereof (opposite to or facing away from the battery cell 10) may be formed in substantially the same sawtooth shape. In an implementation, the inner and outer surfaces of the second holder plate 200 may be formed in a shape that is not aligned with or corresponding to each other.

Figure 8:
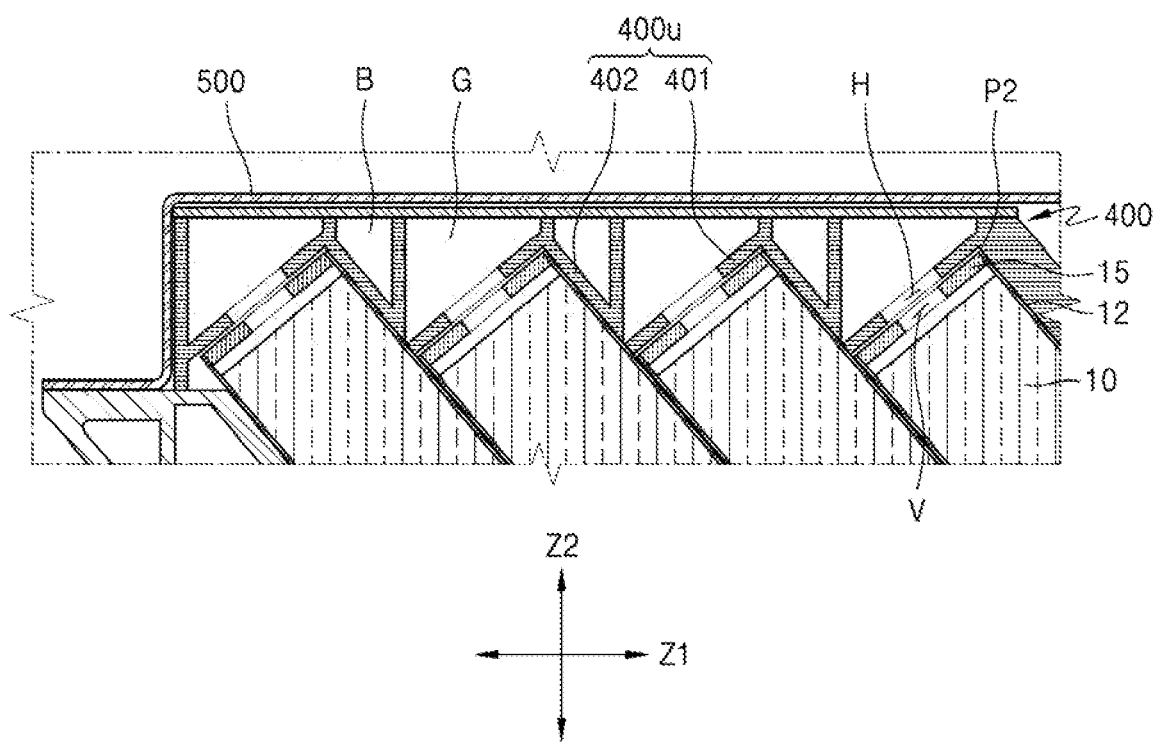
FIGS. 8 and 9 illustrate different views of a vent structure according to an embodiment.
Figure 9:
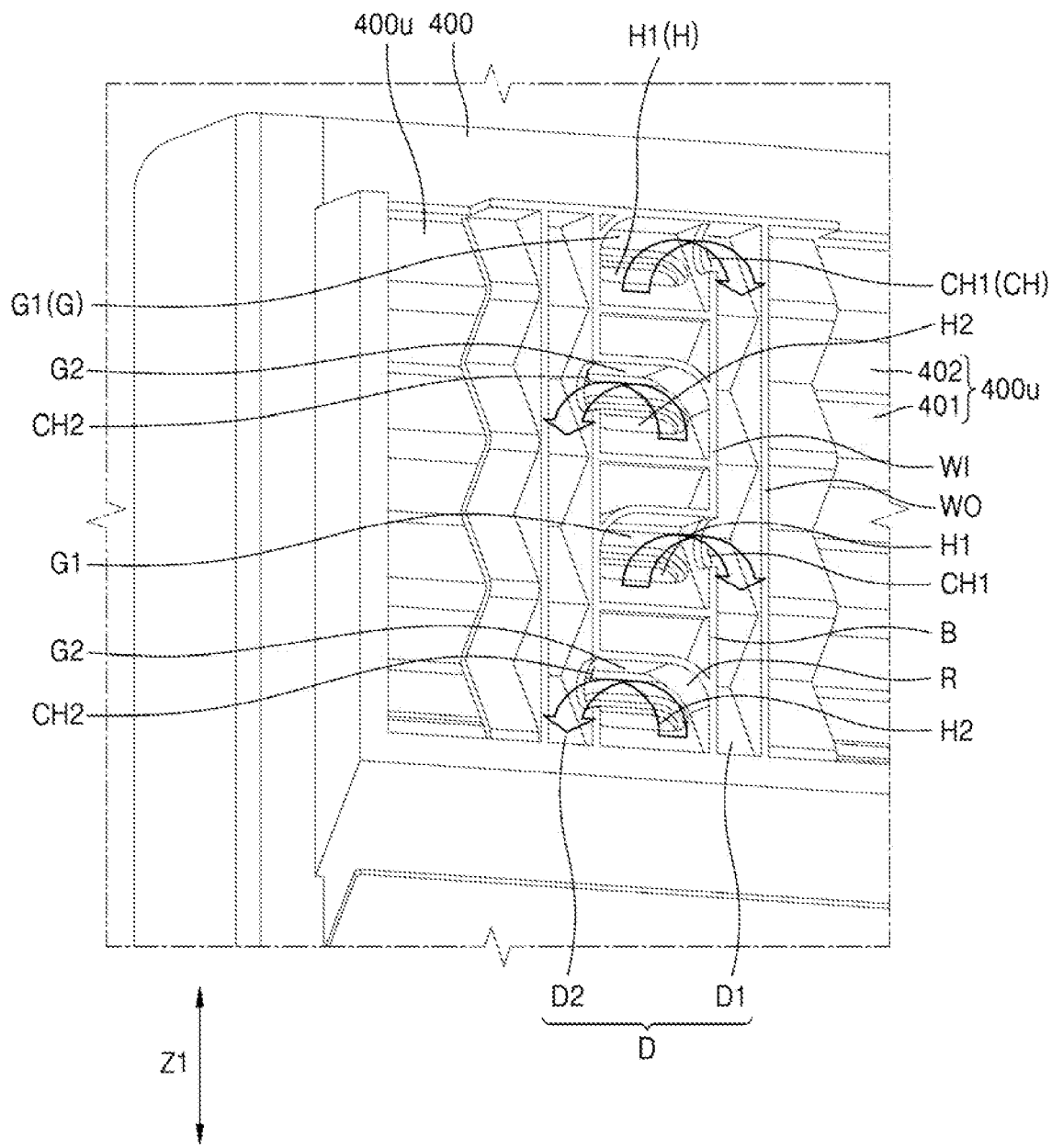

In an implementation, as illustrated in FIGS. 8 and 9, the second holder plate 400 may be provided with a vent hole H forming a discharge path of exhaust gas ejected from the battery cell 10, an accommodation space G, and an exhaust channel D, and at least a part of the second holder plate 200 may be formed in a flat shape by way of a cover 500 covering these components.

Referring to FIG. 1, the first and second holder plates 100 and 200 may press the battery cells 10 (e.g., inwardly) in the vertical direction Z2 based on the first and second edges P1 and P2 forming the lowermost and uppermost portions of the battery cell 10 to fix the positions of the battery cells 10. In an implementation, the first and second edges P1 and P2 may correspond to the fastening positions of the first and second holder plates into which the fastener 300 is fitted along the vertical direction Z2. In this case, the first and second edges P1 and P2 may form a central point of pressing by the first and second holder plates 100 and 200, and in order to stably support the battery cell 10, the first and second edges P1 and P2 may be formed at positions facing or aligned with each other along the vertical direction Z2.

In an implementation, if the first and second edges P1 and P2 corresponding to the fastening positions of the first and second holder plates were to be at positions deviated or offset from each other, rather than at positions facing or aligned with each other along the vertical direction Z2, as a moment arm corresponding to the distance between the fastening positions of the first and second holder plates 100 and 200 deviated from each other is formed, a torque tending to turn over the battery cell 10 could be formed, and the support structure of the battery cell 10 by the first and second holder plates 100 and 200 could become unstable.

In an implementation, the fastener 300 may include a bolt that is fitted to the first and second holder plates 100 and 200 so as to penetrate the first and second holder plates 100 and 200. The fastening positions of the first and second holder plates 100 and 200 (through which the bolt passes) may be formed at positions facing or aligned with each other along the vertical direction Z2. The first and second edges P1 and P2 corresponding to the fastening positions of the first and second holder plates 100 and 200 may also be formed at positions aligned with each other along the vertical direction Z2.

In an implementation, the fastening positions of the first and second holder plates 100 and 200 (into which the fastener 300 may be fitted) may be formed at positions facing each other along the vertical direction Z2, but, unlike the other fastening positions of the first and second folder plates 100 and 200, the first and second edges P1 and P2 may be formed at deviated positions not facing each other along the vertical direction Z2. In an implementation, the fastening positions of the first and second holder plates 100 and 200 (into which the fastener 300 may be fitted) and the first and second edges P1 and P2 may be formed at positions deviated from each other. In this case, the fastening positions of the first and second holder plates 100 and 200 may be formed at positions facing each other along the vertical direction Z2, and the first and second edges P1 and P2 may be formed at deviated positions not facing each other along the vertical direction Z2.

Figure 3A:
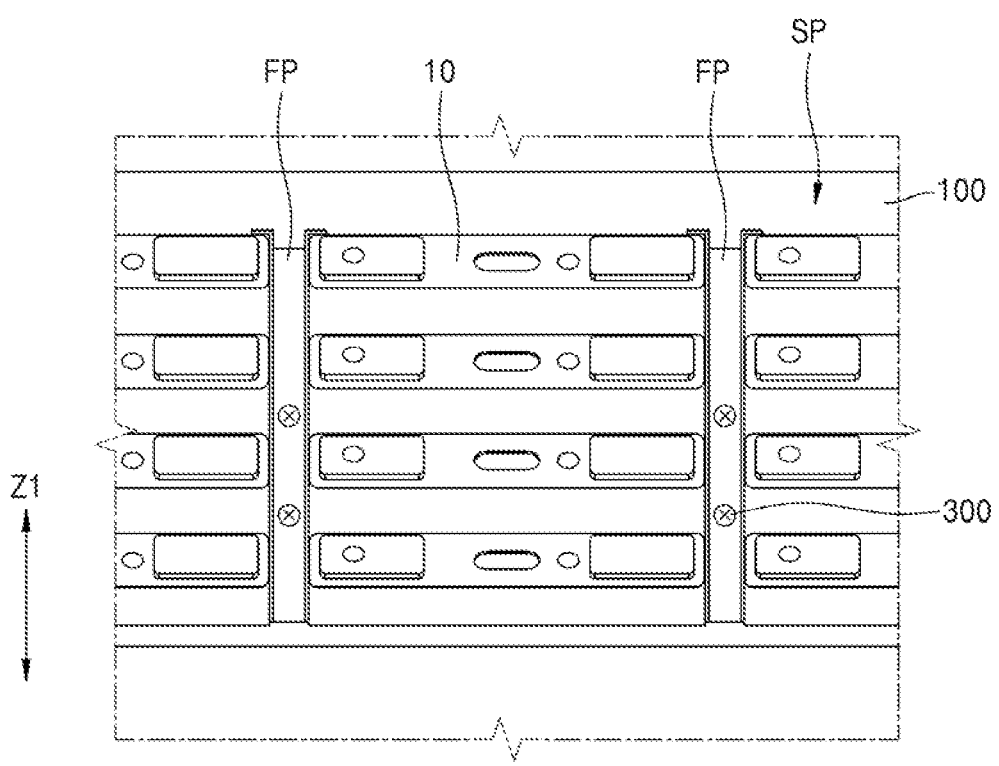
FIGS. 3A and 3B illustrate different views of the structure of first and second holder plates.
Figure 3B:
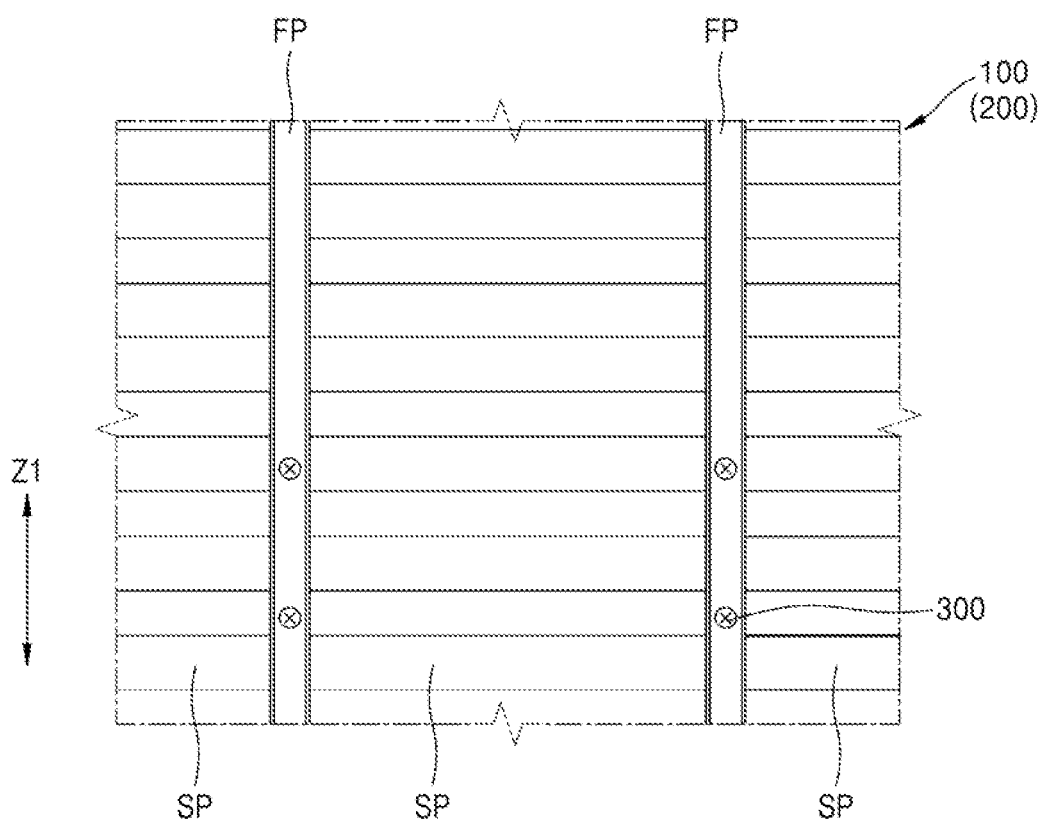

FIGS. 3A and 3B illustrate different drawings of the structure of the first and second holder plates 100 and 200.

Referring to FIGS. 3A and 3B, the first and second holder plates 100 and 200 may extend in a direction crossing the plurality of battery cells 10 to fix the plurality of battery cells 10 in position. In an implementation, the first and second holder plates 100 and 200 may support rows of a plurality of battery cells 10 arranged in rows, respectively. In this case, the first and second holder plates 100 and 200 may be provided with a step portion SP stepped along a sawtooth shape corresponding to the row of each battery cell 10 along the horizontal direction Z1, and may be provided with a plurality of step portions SP spaced apart from each other to correspond to the rows of the plurality of battery cells 10. Each of the step portions SP may include a number of steps corresponding to the number of battery cells 10 forming a row of each battery cell 10. In an implementation, each of the step portions SP may include a plurality of first and second steps 100u and 200u (refer to FIG. 1) that are repeatedly arranged along the horizontal direction (Z1 direction). In an implementation, a fastening portion FP may be formed between the adjacent step portions SP, and the fastening portion FP may be formed in a flat shape to provide a stable fastening position of the fastener 300.

Referring to FIGS. 1, 3A and 3B, the first and second holder plates 100 and 200 may be fitted with a fastener 300 that fastens the first and second holder plates 100 and 200 to each other in a direction facing each other. In an implementation, the fastener 300 may fasten the first and second holder plates 100 and 200 in a direction facing each other while penetrating the first and second holder plates 100 and 200. The fastener 300 may include a bolt that is fitted to the first and second holder plates 100 and 200 so as to penetrate the first and second holder plates 100 and 200, and a nut 301 may be assembled at one end of the bolt. One of the first and second holder plates 100 and 200 may be pressed in a direction facing the counter holder plate by the head of the fastener 300 (bolt), and the other thereof may be pressed in a direction facing the counter holder plate by the nut 301. The fastener 300 may be fitted into the fastening portions FP of the first and second holder plates 100 and 200. In this case, with respect to the fastening position of the fastener 300, the fastener 300 may be fastened at a position corresponding to the first and second edges P1 and P2 of the battery cell 10. In an implementation, the fastener 300 may be fitted to the fastening portions FP of the first and second holder plates 100 and 200, the battery cell 10 may be fixed to the step portion SP of the first and second holder plates 100 and 200, and physical interference may not occur between the battery cell 10 and the fastener 300 at different positions of the first and second holder plates 100 and 200.

Figure 4:
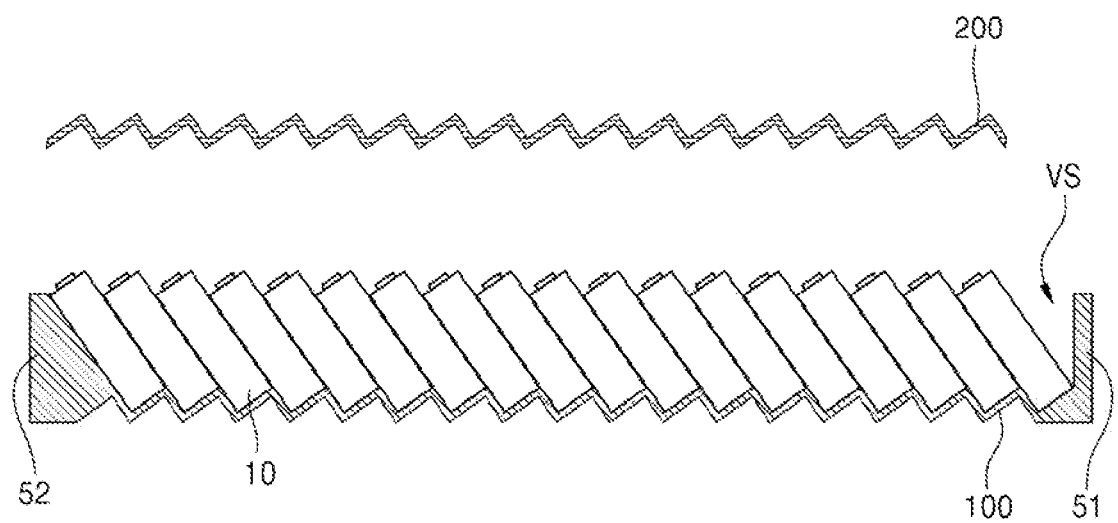
FIG. 4 illustrates a view of a fixing structure of battery cells according to an embodiment.
Figure 4:
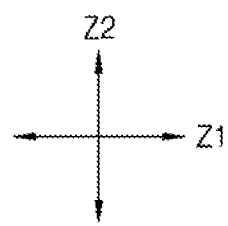

FIG. 4 illustrates a view of a fixing structure of battery cells according to an embodiment.

In an implementation, as illustrated in FIG. 4, the first and second holder plates 100 and 200 may be on both sides of the battery cell 10 along the vertical direction Z2, and a plurality of battery cells 10 between the first and second holder plates 100 and 200 may be fixed in position. In an implementation, first and second end plates 51 and 52 may be on both sides of the battery cell 10 (e.g., row of battery cells 10) along the horizontal direction Z1, and a plurality of battery cells 10 between the first and second end plates 51 and 52 may be fixed in position. As described above, according to an embodiment, the positions of the plurality of battery cells 10 may be strongly fixed by components surrounding the plurality of battery cells 10 in a horizontal direction Z1 along the column direction of the battery cells 10 and a vertical direction Z2 perpendicular to the horizontal direction Z1, e.g., first and second end plates 51 and 52 and first and second holder plates 100 and 200.

Referring to FIG. 4, an approximately triangular empty space VS may be formed between the first end plate 51 and the adjacent battery cell 10, and this empty space VS may provide a space for avoiding physical interference with the first holder plate 100 while assembling the obliquely aligned battery cells 10 toward the first holder plate 100 along the vertical direction Z2. In an implementation, the empty space VS between the first end plate 51 and the adjacent battery cell 10 may provide a space to avoid when assembling the battery cell 10, and may be filled with an filling member or filling material after assembly of the battery cells 10 is completed.

Figure 5:
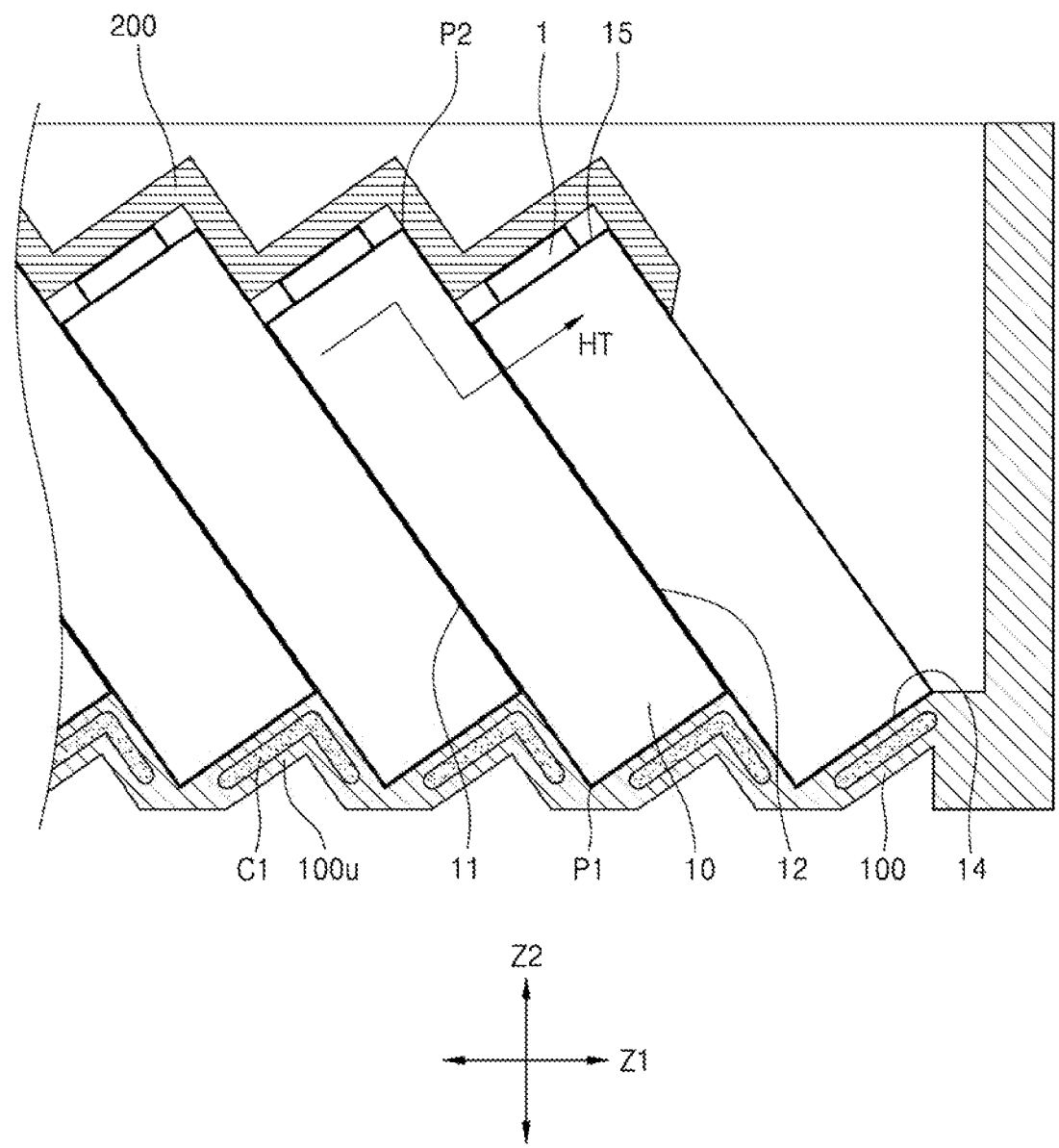
FIG. 5 illustrates a view of a thermal runaway prevention mechanism in the battery pack according to an embodiment.

FIG. 5 illustrates a view of a thermal runaway prevention mechanism in the battery pack according to an embodiment.

In the inclined arrangement structure of the battery cells 10 according to the embodiment shown in FIG. 5, the adjacent battery cells 10 may face (e.g., contact) each other through parts of the main surfaces 11 and 12, so that thermal interference (e.g., thermal communication) between the adjacent battery cells 10 may be reduced, and thermal runaway may be suppressed. In the upright arrangement structure of the battery cells 10' according to a comparative example shown in FIG. 2, the adjacent battery cells 10 may face (e.g., contact) each other through all of the main surfaces 11 and 12, so that thermal interference (e.g., thermal communication) between the adjacent battery cells 10 may be increased, and the adjacent battery cells 10 may be more vulnerable to thermal runaway.

In the inclined arrangement structure of the battery cells 10 according to an embodiment, parts of the main surfaces 11 and 12 facing each other between adjacent battery cells 10 may correspond to intermediate or central regions of the main surfaces 11 and 12, and the terminal surfaces 15 of the adjacent battery cells 10 may be arranged to deviate or be offset from each other. A terminal 1 in which charging and discharging currents are concentrated may be on the terminal surface 15 of the battery cell 10, and relatively greater heat generation may occur there. In the inclined arrangement structure, the terminal surfaces 15 may be offset from each other, it is possible to block direct transfer of a large amount of heat between adjacent battery cells 10. In an implementation, the adjacent terminal surfaces 15 may be offset from each other, a part of the second main surface 12 may be between the adjacent terminal surfaces 15, and a heat dissipation path HT between the adjacent terminal surfaces 15 may be much longer, thereby increasing thermal resistance (e.g., reducing thermal communication). Meanwhile, in the upright arrangement structure of the battery cells 10' according to a comparative example shown in FIG. 2, the terminal surfaces 15' between adjacent battery cells 10' may be directly adjacent or in contact with each other, and thermal interference between adjacent battery cells 10' may be increased through the terminal surface 15', causing relatively greater heat generation or transfer.

In an implementation, as illustrated in FIG. 5, the first holder plate 100 may be provided with a cooling channel C1 providing a flow path of a cooling medium. The cooling channel C1 may be formed in a curved or bent shape to correspond to the step 100u of the first holder plate 100, and may cool the bottom surface 14 of one battery cell 10 and (e.g., a part of) the first main surface 11 of an adjacent battery cell 10 together.

Figure 7:
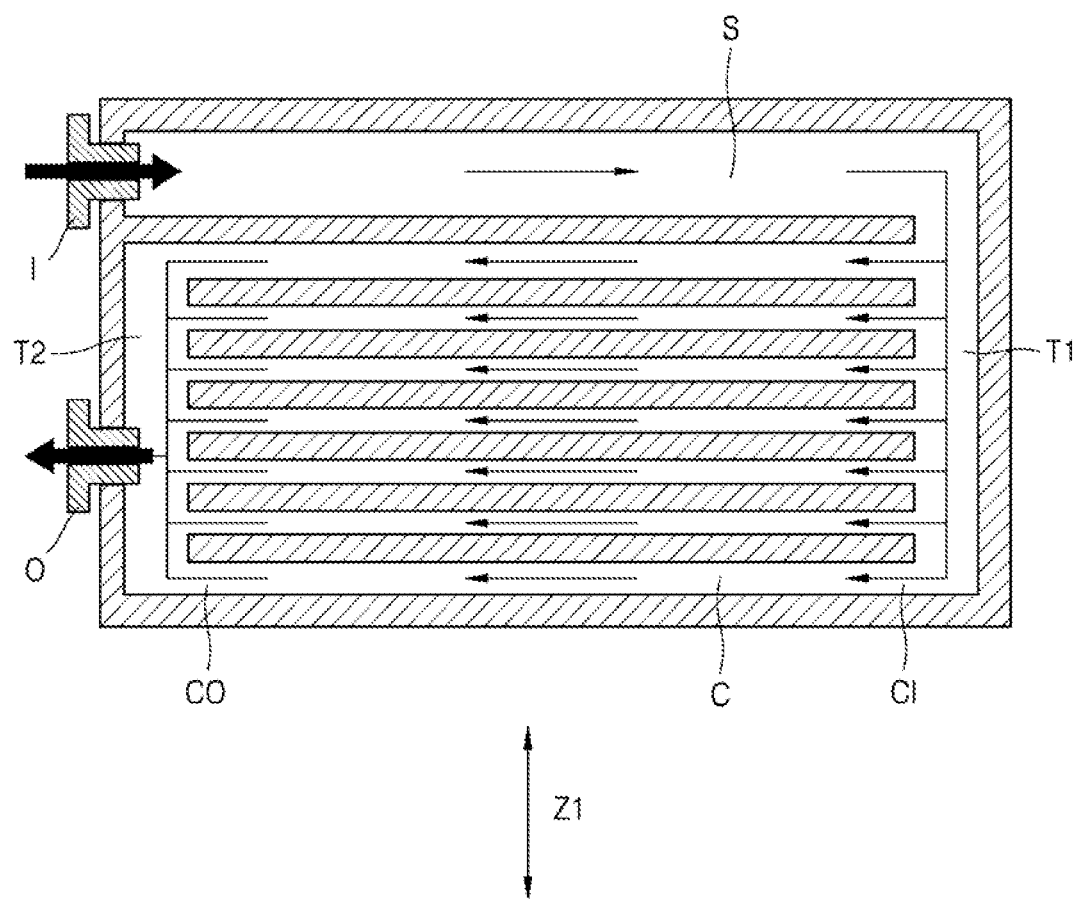

FIGS. 6 and 7 illustrate different views of a cooling structure according to an embodiment.

In an implementation, as illustrated in FIG. 6, a cooling channel C may be formed in at least one of the first holder plate 300 and the second holder plate. The cooling medium may flow through the cooling channel C and cool the battery cell 10 supported by the holder plate 300. In an implementation, the cooling channel C may be selectively formed in the first holder plate 300 of the first holder plate 300 and the second holder plate.

In an implementation, the cooling channel C may be formed in the first step 300u of the first holder plate 300. One cooling channel C may be formed for each first step 300u, and the plurality of battery cells 10 supported by the first holder plate 300 may be uniformly cooled through the plurality of cooling channels C. Each cooling channel C may be formed between a first portion 301 (supporting the bottom surface 14 of one battery cell 10) and a second portion 302 (supporting the first main surface 11 of another adjacent battery cell 10), thereby cooling the adjacent battery cells together.

In the inclined arrangement structure of the battery cell 10 according to the embodiment, the first edge P1 (where the bottom surface 14 and the first main surface 11 of the battery cell 10 meet) may form the lowermost portion of the battery cell 10, and the cooling channel C may be formed using the first step 300u (corresponding to an extra (e.g., otherwise unused) region between the adjacent first edges P1 along the horizontal direction (Z1 direction)), so that it may not be necessary to allocate a separate region or space for forming the cooling channel C.

In an implementation, the cooling medium flowing through the cooling channel C may include a liquid cooling medium having a relatively large heat capacity In an implementation, the cooling medium flowing through the cooling channel C may include a gaseous cooling medium such as air. In an implementation, as the cooling medium, an insulating coolant having electrically insulating properties or a conductive coolant having electrically conductive properties may be used. In an implementation, a gaseous cooling medium such as air or refrigerant gas may be used as the cooling medium.

The first step 300u may be provided with a first hollow portion A1 in addition to the cooling channel C. The first hollow portion A1 may be formed in a state where the inside thereof is empty (e.g., may be a hole in the first holder plate 300, and may provide an advantageous weight reduction of the first holder plate 300. In an implementation, the first hollow portion A1 may be filled with air, and the air charged in the first hollow portion A1 in a static state in which a flow rate is close to zero may provide thermal insulation for the cooling channel C, so that a temperature of the cooling medium flowing through the cooling channel C may not increase according to the ambient temperature, thereby preventing a cooling effect from deteriorating. In an implementation, the air charged in the first hollow portion A1 may help block the heat transfer from the ground or structure on which the battery pack is supported, and an undesirable increase in the temperature of the cooling medium flowing through the cooling channel C (e.g., from external heat) may be prevented.

Regarding the position of the first hollow portion A1 formed in the first step 300u, the first hollow portion A1 may be formed at the side of the first portion 301 of the first step 300u, and may be formed closer to the ground on which the battery pack is supported (e.g., lower end of the battery pack) rather than the cooling channel C. In an implementation, the first hollow portion A1 may be formed at a lower position oblique with respect to or offset from the cooling channel C formed between the first and second portions 301 and 302 of the first step 300u. The location closer to the lower end of the battery pack may correspond to the region most vulnerable to heat transfer from the ground, and the first hollow portion A1 may be formed at a position close to the ground, e.g., a lower position under the cooling channel C.

In an implementation, as illustrated in FIG. 6, the bottom of the first holder plate 300 may be formed in a flat shape to support the battery pack. In an implementation, the bottom of the first holder plate 300 may have various shapes partially concave, rather than a flat shape, and direct contact between the cooling channel C and the outside may be promoted.

One cooling channel C may be provided for each of the first steps 300u, and a plurality of cooling channels C may be provided corresponding to the plurality of first steps 300u. Referring to FIG. 7, the plurality of cooling channels C may be connected in parallel to each other on a cooling circuit, an inlet CI and outlet CO of each cooling channel C may be connected to each other, and the cooling medium introduced through the inlets CI fluidly connected to each other may be simultaneously distributed to the plurality of cooling channels (C) and the cooling medium discharged through the outlets CO fluidly connected to each other may be simultaneously collected from the plurality of cooling channels C. In an implementation, the plurality of cooling channels C may be connected in a parallel structure in which the inlet CI and the outlet CO are fluidly connected to each other, so that the plurality of battery cells 10 may be uniformly cooled through the plurality of cooling channels C. If the plurality of cooling channels were to be connected in series on the cooling circuit, in a cooling channel closer to the inlet side on the cooling circuit, the temperature of the cooling medium may be kept low, and a higher cooling effect may be obtained, whereas in a cooling channel closer to the outlet side on the cooling circuit, the temperature of the cooling medium rises, and the cooling effect may decrease. An imbalance of the cooling effect may be caused depending on the position of the battery cell.

The inlets CI of the plurality of cooling channels C may be fluidly connected to each other through a first tank portion or distributor T1, and may be connected to a cooling medium supply pipe S through the distributor T1 connected to the inlets CI of the plurality of cooling channels C. The cooling medium supply pipe S may be connected to an inlet I (through which the cooling medium is introduced), and may supply the cooling medium in a direction opposite to the flow direction in the cooling channel C. The cooling medium introduced into the distributor T1 through the cooling medium supply pipe S may be distributed to each cooling channel C while the flow direction is changed in the distributor T1. In an implementation, the distributor T1 may have a manifold structure that distributes the cooling medium supplied through the cooling medium supply pipe S to each cooling channel C, or may have a diaphragm structure blocking a rear side of the inlet C1 of the cooling channer C to U-turn the cooling medium supplied through the cooling medium supply pipe S toward the inlet CI of the cooling channel C.

The outlets CO of the plurality of cooling channels C may be fluidly connected to each other, and may be connected to an outlet O through which the cooling medium flows through a second tank or collector T2 connected to the outlets CO of the plurality of cooling channels C. The cooling medium discharged from each cooling channel C may be collected into the collector T2 through the outlet CO of the cooling channel C, and may be discharged to the outside through the outlet O connected to the collector T2.

Referring to FIG. 6, the cooling medium supply pipe S may be formed in the first holder plate 300. In an implementation, in the first holder plate 300, the cooling medium supply pipe S may be outside a region in which the plurality of battery cells 10 are disposed, or outside a region in which the plurality of cooling channels for cooling the respective battery cells 10 are formed, e.g., may be disposed at the edge of the battery pack. In an implementation, the first holder plate 300 may further include a second hollow portion A2 formed around the cooling medium supply pipe S. The second hollow portion A2 may serve a purpose substantially similar to that of the first hollow portion A1 formed around the cooling channel C. In an implementation, the second hollow portion A2 may be formed in a state where the inside thereof is emptied, and may thus provide a structure advantageous in weight reduction of the first holder plate 300. The air charged in the second hollow portion A2 in a static state in which a flow rate is close to zero may provide thermal insulation for the cooling medium supply pipe S, so that a temperature of the cooling medium flowing through the cooling medium supply pipe S does not increases according to the ambient temperature, thereby preventing a cooling effect from deteriorating. The second hollow portion A2 around the cooling medium supply pipe S may serve a similar purpose to the first hollow portion A1 around the cooling channel C, and may be formed to have a larger area than the first hollow portion A1 around the cooling channel C. In an implementation, the cooling medium supply pipe S may be disposed outside the region in which the plurality of battery cells area arranged and may be formed at the edge of the battery pack that does not need to provide a space for accommodating the plurality of battery cells 10 and may have a relatively large extra area (e.g., unused or dead space), the second hollow portion A2 having a relatively large area may be formed (e.g., without needlessly increasing a size of the battery pack). In an implementation, the second hollow portion A2 around the cooling medium supply pipe S may surround the cooling medium supply pipe S.

FIGS. 8 and 9 illustrate different views of a vent structure according to an embodiment In an implementation, as illustrated in FIG. 8, each of the battery cells 10 of the battery pack may be provided with a vent portion for relieving excess inner pressure that may occur while a part of the battery cell 10 is broken when the inner pressure of the battery cell 10 increases to a predetermined threshold pressure or more. The vent portion V may be formed on the terminal surface 15 or the bottom surface 14 of the battery cell 10. In an implementation, the vent portion V may be formed on the terminal surface 15 of the battery cell 10.

The exhaust gas discharged through the vent portion V on the terminal surface 15 may be introduced or directed into the accommodation space G through the vent hole H of the second holder plate 400. In an implementation, the vent hole H may be formed in the first portion 401 supporting the terminal surface 15 of the battery cell 10 in the second step 400u of the second holder plate 400 and may be formed at a position facing the vent portion V formed on the terminal surface 15 of the battery cell 10, so that the exhaust gas ejected through the vent portion V may be discharged or directed directly into the accommodation space G through the vent hole H of the second step 400u.

The accommodation space G may be an inner space of the second step 400u, e.g., an inner space of the second step 400u defined by the first and second portions 401 and 402 supporting the terminal surface 15 and second main surface 12 of the battery cells 10 adjacent to each other, and the cover 500 covering the upper portions of the first and second portions 401 and 402. In an implementation, the second step 400u may be provided with a partition wall B, and the accommodation space G may correspond to an inner space of the second step 400u, defined by the first and second portions 401 and 402 of the second step 400u and the cover 500, excluding the partition wall B. In an implementation, the partition wall B may be formed at the side of the second portion 402 of the second step 400u, and not the first portion 401 thereof provided with the vent portion V, and the accommodation space G may correspond to an inner space of the second step 400u that is between the partition B and the first portion 401 and is covered by the cover 500.

The accommodation space G may temporarily accommodate high-pressure exhaust gas ejected through the vent portion V of the battery cell 10, may reduce the pressure of the exhaust gas through the volume expansion of the exhaust gas, may change the direction of or direct the exhaust gas toward the exhaust channel D, and may provide a kind of buffer region between the vent portion V (or the vent hole H connected to the vent portion V) of the battery cell 10 and the exhaust channel D.

In the inclined arrangement structure of the battery cells 10 according to the embodiment, the second edge P2 where the terminal surface 15 and second main surface 12 of the battery cell 10 contact each other may form the uppermost portion of the battery cell 10, the accommodation space G may be formed using the second step 400u corresponding to an extra region (e.g., otherwise unused or dead space) between the adjacent second edges P2 along the horizontal direction Z1, so that it may not be necessary to allocate a separate region or additional space in order to form the accommodation space G.

Referring to FIG. 9, the exhaust channel D may include first and second exhaust channels D1 and D2 extending in parallel along the horizontal direction Z1 in which the battery cells 10 are arranged at both sides of the accommodation space G. The exhaust channel D may be fluidly connected to the plurality of accommodation spaces G arranged along the horizontal Z1, and may provide a path for discharging exhaust gas from the plurality of accommodation spaces G to the outside of the battery pack. In an implementation, the accommodation space G may include first and second accommodation spaces G1 and G2 alternately disposed along the horizontal direction Z1. In an implementation, the first accommodation space G1 may be fluidly connected to the first exhaust channel D1, and the second accommodation space G2 may be fluidly connected to the second exhaust channel D2. In an implementation, not all of the plurality of accommodation spaces G arranged along the horizontal direction Z1 may be connected to one (e.g., the same) exhaust channel D. In an implementation, the first and second accommodation spaces G1 and G2 are alternately arranged along the horizontal direction Z1, the first accommodation space G1 may be connected to the first exhaust channel D1, the second accommodation space G2 may be connected to the second exhaust channel D2, the exhaust gas discharged from the plurality of accommodation spaces G may be efficiently dispersed through the first and second exhaust channels D1 and D2, and the exhaust gas may be quickly discharged to the outside of the battery pack through the first and second exhaust channels D1 and D2.

Each of the first and second exhaust channels D1 and D2 may include an inner wall WI relatively close to the accommodation space G, and an outer wall WO relatively far from the accommodation space G, and may include a channel-shaped space defined between the inner wall WI and the outer wall WO. A connection hole CH connecting the accommodation space G and the first and second exhaust channels D1 and D2 to each other may be formed in the inner wall WI. The inner wall WI may extend along the horizontal direction Z1 in which the battery cells 10 are arranged, and may include first and second connection holes CH1 and CH2 alternately formed along the horizontal direction Z1. In an implementation, the inner wall WI of the first exhaust channel D1 may include a first connection hole CH1 formed for each position corresponding to the first accommodation space G1 of the first and second accommodation spaces G1 and G2 alternately arranged along the horizontal direction Z1. In an implementation, the inner wall WI of the second exhaust channel D1 may include a second connection hole CH2 formed for each position corresponding to the second accommodation space G2 of the first and second accommodation spaces G1 and G2 alternately arranged along the horizontal direction Z1.

The exhaust channel D being fluidly connected to the plurality of accommodation spaces G along the horizontal direction Z1 may mean that the exhaust channel D is fluidly connected to the plurality of vent holes H along the horizontal direction Z1. In an implementation, the vent holes H formed in the second holder plate 400 may include first and second vent holes H1 and H2 alternately arranged in the horizontal direction Z1 in which the battery cells 10 are arranged, the first vent hole H may be fluidly connected to the first exhaust channel D1, and the second vent hole H2 may be fluidly connected to the second exhaust channel D2. In an implementation, the first and second vent holes H1 and H2 may be fluidly connected to the first and second accommodation spaces G1 and G2, respectively, and may be fluidly connected to the first and second exhaust channels D1 and D2 through the first and second accommodation spaces G, respectively.

The exhaust channel D may extend across the plurality of second steps 400u arranged along the horizontal direction Z1. The exhaust channel D may be defined by the first and second portions 401 and 402 of the second step 400u and the cover 500 (refer to FIG. 8) covering the upper portions of the first and second portions 401 and 402. The accommodation space G and the exhaust channel D may be provided as a space covered by the cover 500 between the first and second portions 401 and 402 of the second step 400u, and in this case, the accommodation space G and the exhaust channel D may be partitioned by the inner wall WI. The accommodation space G and the exhaust channel D may be provided as a space covered by the cover 500 between the first and second portions 401 and 402 of the second step 400u may include a case where the range or size of the accommodation space G is limited by the partition wall B, e.g., a case where the accommodation space G is limited to a portion covered by the cover 500 between the partition wall B and the first portion 401.

Referring to FIGS. 8 and 9, the partition wall B for partitioning the first and second accommodation spaces G1 and G2 from each other may be between the first and second accommodation spaces G1 and G2. In an implementation, the partition B may be between the first and second accommodation spaces G1 and G2 along the horizontal direction (Z1 direction) in which the battery cells 10 are arranged. In an implementation, the partition wall B may be formed at one side of the second step 400u. In an implementation, the partition wall B may be formed at the side of the second portion 402 of the second step 400u, rather than the first portion 401 thereof in which the vent hole H is formed. The first and second accommodation spaces G1 and G2, which are adjacent to each other, may be partitioned from each other by the partition wall B, so that, e.g., the exhaust gas of the first accommodation space G1 may be prevented from flowing into the second accommodation space G2 or conversely, the exhaust gas of the second accommodation space G2 may be prevented from flowing into the first accommodation space G1. In an implementation, as illustrated in FIG. 9, the partition wall B may be provided in the form of a hollow member or space having an empty inner portion. In an implementation, the partition wall B may include a plurality of ribs extending across the inside of the hollow member to reinforce strength. At least some of the wall bodies of the partition wall B may include a rounded portion R, which may change the direction of or direct exhaust gas ejected from the vent hole H through the rounded portion R, and may facilitate smooth conversion of the direction of the exhaust gas toward the exhaust channel D. Referring to FIG. 9, the rounded portion R may be formed at the wall body facing the connection hole CH connected to the exhaust channel D among the wall bodies of the partition wall B, e.g., at the wall body formed opposite to the connection hole CH.

In the inclined arrangement structure of the battery cells 10 according to the embodiment, the second edge P2 where the terminal surface 15 and second main surface 12 of the battery cell 10 contact each other may form the uppermost portion of the battery cell 10, the accommodation space G may be formed using the second step 400u corresponding to an extra region between the adjacent second edges P2 along the horizontal direction Z1, so that the accommodation space G may accommodate high-pressure exhaust gas ejected through the vent portion of the battery cell 10 and may reduce the pressure of the exhaust gas through the volume expansion of the exhaust gas.

Figure 10:
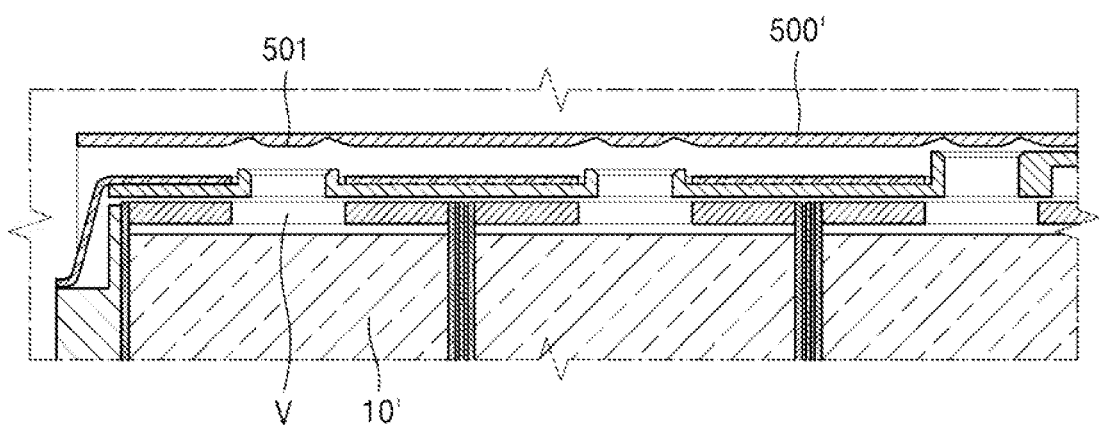
FIG. 10 illustrates a vent structure according to a comparative example for comparison with the present disclosure.

FIG. 10 illustrates a vent structure according to a comparative example for comparison with the present disclosure.

In the upright arrangement structure of the battery cell 10' according to a comparative example shown in FIG. 10, exhaust gas discharged through the vent portion V of the battery cell 10' may be ejected to the outside without passing through a buffer area such as the accommodation space G, while maintaining a high pressure, e.g., the exhaust gas may be ejected to the outside through a broken portion 501 of the cover 500' to cause a risk factor for external environments. In a battery pack used as a driving power source for a vehicle, there is a risk that high-pressure exhaust gas is ejected into the interior of the vehicle.

Hereinafter, in the inclined arrangement structure of battery cells 10 according to an embodiment and the upright arrangement structure of battery cells 10' according to a comparative example for comparison with the present disclosure, different behaviors in response to the swelling of the battery cells 10 and 10' will be described.

Figure 11:
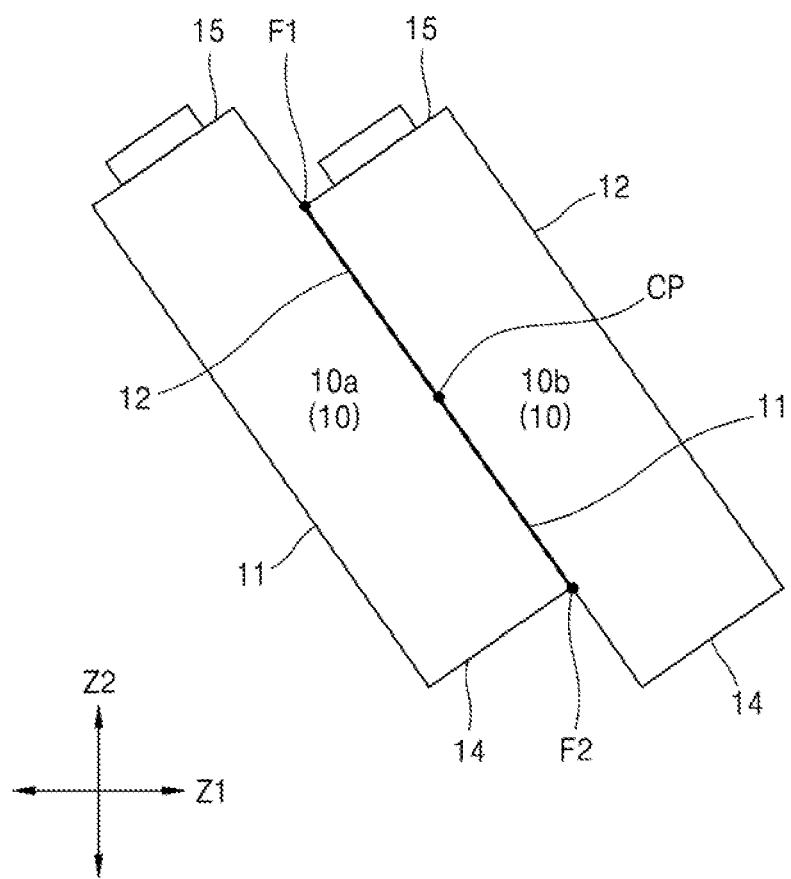
FIGS. 11 and 12 illustrate different views of a mechanism for suppressing volume expansion due to swelling of battery cells in the battery pack according to an embodiment.
Figure 12:
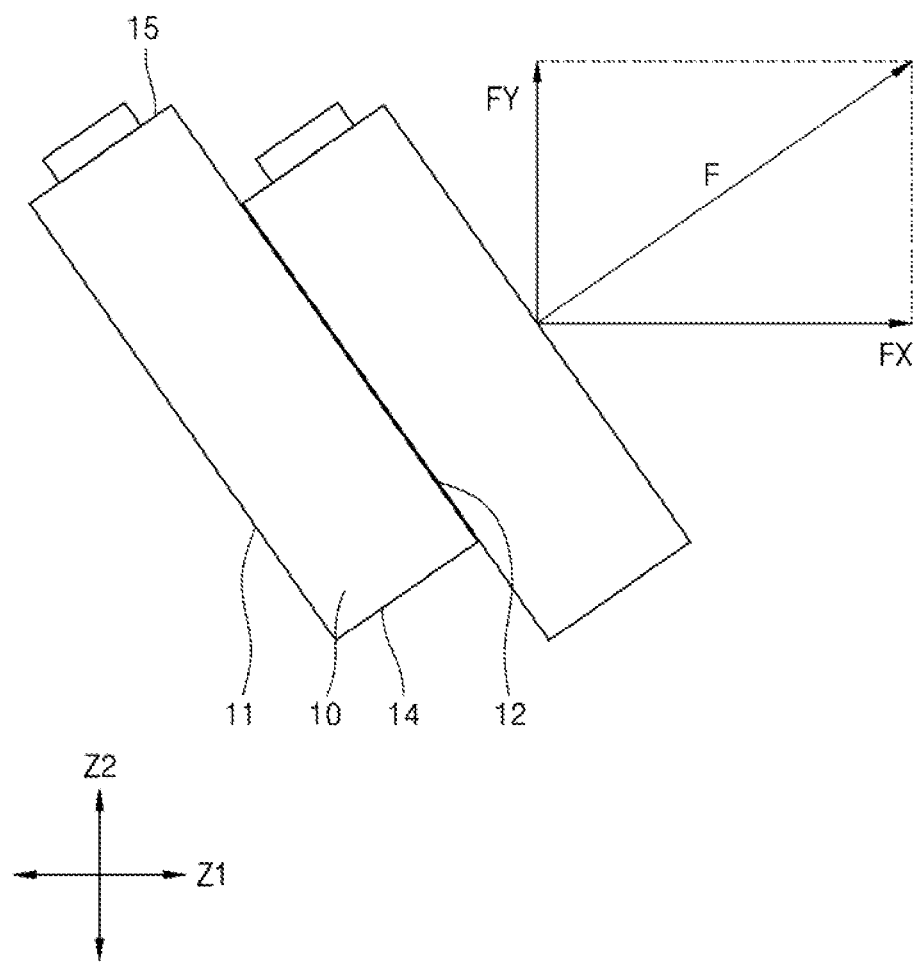

FIGS. 11 and 12 illustrate different views of a mechanism for suppressing volume expansion due to the swelling of battery cells in the battery pack according to an embodiment.

In an embodiment shown in FIG. 11, a plurality of battery cells 10 forming a battery pack may be obliquely arranged. In an implementation, adjacent battery cells 10 may face each other, the adjacent battery cells may face each other through only parts of the main faces 11 and 12, and may not face each other through all or the entirety of of the main faces 11 and 12. In such an inclined arrangement structure of the battery cells 10, volume expansion of the battery cells 10 due to swelling of the battery cells 10 may be effectively suppressed.

In the battery cell 10, swelling may occur along with or during charging and discharging operations. In an implementation, in the swelling of the battery cell 10, as the volume of the battery cell 10 expands, the main surfaces 11 and 12 of the battery cell 10 may swell, electrical characteristics of the battery cell 10 may be changed depending on the volume expansion of the battery cell 10, and charge-discharge characteristics of the battery cell 10 could be deteriorated. In the inclined arrangement structure of the battery cells 10 according to an embodiment, the volume expansion of the battery cell 10 may be effectively suppressed, and deterioration in charge and discharge characteristics due to the volume expansion of the battery cell 10 may be reduced or prevented. In the inclined arrangement structure of the battery cells 10, when the first and second battery cells 10a and 10b adjacent to each other face or contact each other through only parts of the main surfaces 11 and 12 and the main surface 12 of the first battery cell 10a comes into contact with or is adjacent to the terminal surface 15 of the adjacent second battery cell 10b, the main surface 12 of the first battery cell 10a may be pressed by the terminal surface 15 of the second battery cell 10b, and the convex swelling of the main surface 12 of the first battery cell 10a may be effectively suppressed. In an implementation, the main surface 11 of the second battery cell 10b may come into contact with or be adjacent to the bottom surface 14 of the first battery cell 10a, the main surface 11 of the second battery cell 10b may be pressed by the bottom surface 14 of the first battery cell 10a, and the convex swelling of the main surface 11 of the second battery cell 10b may be effectively suppressed. In an implementation, in the inclined arrangement structure of the battery cells 10, the terminal surfaces 15 or the bottom surfaces 14 of the first and second battery cells 10a and 10b may press the main surfaces 11 and 12 of the adjacent second and first battery cells 10a and 10b, respectively, and in this case, an intermediate or central region between both ends of the main surfaces 11 and 12, rather than the outer ends thereof, may be pressed, thereby effectively reducing or preventing the central positions CP of the main surfaces 11 and 12 from convexly swelling. In the swelling of the battery cell 10, the central positions CP of the main surfaces 11 and 12 may convexly swell. In the inclined arrangement structure, pressing points F1 and F2 may be formed by the terminal surface 15 or bottom surface 14 of the adjacent battery cell 10 in the intermediate region adjacent to the central positions CP, thereby effectively preventing the central positions CP from convexly swelling. The first and second battery cells 10a and 10b may be fixed in position between the first and second holder plates 100 and 200 and may maintain their positions despite the swelling of the second and first battery cells 10a and 10b adjacent to each other, the pressing points F1 and F2 capable of suppressing the swelling may be formed between the first and second battery cells 10a and 10b adjacent to each other.

As shown in FIG. 2, in the upright arrangement structure of the battery cells 10' according to a comparative example for comparison with the present disclosure, the first and second battery cells 10a' and 10b' adjacent to each other face each other through the entire main surfaces 11' and 12', and in this case, the terminal surface 15 ' and bottom surface 14' of the first and second battery cells 10a ' and 10b' press both ends of the main surfaces 11' and 12' of the adjacent second and first battery cells 10a' and 10b' to form pressing points F1' and F2', thereby effectively preventing the central positions CP from convexly swelling. That is, when comparing FIGS. 2 and 11 with each other, in the inclined arrangement structure according to an embodiment, the pressing points F1 and F2 between the adjacent first and second battery cells 10a and 10b are formed in an intermediate region between both ends of the main surfaces 11 and 12, so that the pressing points F1 and F2 are formed at a region (intermediate region) relatively closer to the central positions CP of the main surfaces 11 and 12. In contrast, in the upright arrangement structure according to a comparative example for comparison with the present disclosure, the pressing points F1' and F2' between the adjacent first and second battery cells 10a' and 10b' are formed at both outer ends of the main surfaces 11' and 12', so that the pressing points F1' and F2' are at positions (both ends) relatively far from the central positions CP' of the main surfaces 11' and 12' (both end positions). Accordingly, in the inclined arrangement structure according to an embodiment, swelling (in which the central positions CP of the main surfaces 11 and 12 are convexly swelled) may be effectively suppressed. In contrast, in the upright arrangement structure according to a comparative example, it is difficult to effectively suppress swelling in which the central positions CP' of the main surfaces 11' and 12' are convexly swelled (e.g., because the pressing points as relatively far from the swelled central positions).

In the inclined arrangement structure according to the embodiment shown in FIG. 12, the swelling force F acting along the main surface direction of the battery cell 10 (a direction perpendicular to the main surfaces 11 and 12) may be decomposed or separated into a vertical direction Z2 and a horizontal direction Z1. Accordingly, with respect to the first and second holder plates 100 and 200 (refer to FIG. 4) in the vertical direction Z2 and the first and second end plates 51 and 52 (refer to FIG. 4) in the horizontal direction Z1, the vertical decomposition component FY and horizontal decomposition component FX of the swelling force F may act, respectively, and not the entire swelling force F, but only a part of the swelling force F decomposed into the vertical decomposition component FY and the horizontal decomposition component FX may act, so that it is possible to reduce a load burden on the first and second holder plates 100 and 200 (refer to FIG. 4) or the first and second end plates 51 and 52 (refer to FIG. 4), and it is possible to effectively suppress the swelling of the battery cell 10 even if the bonding strength between the first and second holder plates 100 and 200 (refer to FIG. 4) or between the first and second end plates 51 and 52 (refer to FIG. 4) for swelling is lowered. As described above, in the inclined arrangement structure according to an embodiment, the bonding strength between the first and second holder plates 100 and 200 or between the first and second end plates 51 and 52 for swelling may be lowered, in the upright arrangement structure of the battery cells 10' according to the comparative example shown in FIG. 2, a pair of end plates 50' with a plurality of battery cells 10' therebetween may be pressed toward each other, and a compressing process of pressing the plurality of battery cells 10' between a pair of end plates 50' at high pressure may be omitted.

In the upright arrangement structure of the battery cells 10' according to the comparative example shown in FIG. 2, the entire swelling force acting along the main surface direction of the battery cell 10' (the direction perpendicular to the main surfaces 11' and 12') may act in the horizontal direction Z1, and may act on a pair of end plates 50' disposed on both sides of the plurality of battery cells 10' along the horizontal direction Z1, so that the load burden on the end plate 50' increases. Accordingly, in the upright arrangement structure of the battery cell 10' as shown in FIG. 2, the pair of end plates 50' on both sides of the plurality battery cells 10' are pressed toward each other, and a compressing process of pressing the plurality of battery cells 10' between the pair of end plates 50' at high pressure is required.

According to the present disclosure, the inclined arrangement structure of battery cells may be applied, thereby providing a battery pack that is advantageous in reducing or suppressing the thermal runaway and swelling phenomena of battery cells while making the battery pack slim in height and a reduced overall size.

According to the present disclosure, in the inclined arrangement structure of battery cells, a cooling channel may be formed using a residual or otherwise unused region between first edges of battery cell adjacent to each other, thereby providing a battery pack having improved cooling efficiency of battery cells without needing to allocate a separate area or space for the formation of a cooling channel (e.g., thereby reducing an overall size of the battery pack).

According to the present disclosure, in the inclined arrangement structure of battery cells, an exhaust structure may be formed using a residual region between first edges of battery cell adjacent to each other, thereby providing a battery pack capable of eliminating the risk of safety accidents due to high exhaust gas ejection pressure without needing to allocate a separate area for the formation of an accommodation space for accommodating high-pressure exhaust gas (e.g., thereby reducing an overall size of the battery pack).

One or more embodiments may provide a battery pack that helps reduce or suppress thermal runaway and swelling phenomena of battery cells while minimizing the height of the battery pack.

One or more embodiments may provide a battery pack having improved cooling efficiency of battery cells without allocating a separate area for a cooling channel.

One or more embodiments may provide a battery pack capable of reducing or eliminating the risk of safety accidents due to high exhaust gas ejection pressure without allocating a separate area for an accommodation space for accommodating high-pressure exhaust gas.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells arranged in a row in a first direction, the plurality of battery cells being arranged obliquely with respect to the first direction;
a first holder plate and a second holder plate arranged to face each other and support the plurality of battery cells therebetween, the first holder plate including a plurality of first steps repeatedly arranged to surround and support first vertically protruding edges of the plurality of battery cells and the second holder plate including a plurality of second steps repeatedly arranged to surround and support second vertically protruding edges of the plurality of battery cells; and
at least one cooling channel passing through each of the first steps in a second direction perpendicular to the first direction,
wherein the first steps each include a first hollow portion having an empty inner portion at a position adjacent to the at least one cooling channel, the first hollow portion being isolated from the at least one cooling channel and passing through the first steps in the second direction.

2. The battery pack as claimed in claim 1, wherein each of the battery cells includes:
a terminal surface including a terminal;
a bottom surface opposite to the terminal surface;
a first main surface and a second main surface, the first and second main surfaces connecting the terminal surface and the bottom surface and each having a first area; and
a pair of side surfaces connecting the terminal surface and the bottom surface, the side surfaces each having a second area that is smaller than the first area.

3. The battery pack as claimed in claim 2, wherein the first holder plate supports the bottom surface and the first main surface around a corresponding one of the first vertically protruding edges where the bottom surface and the first main surface of the battery cell meet.

4. The battery pack as claimed in claim 3, wherein the first steps each include:
a first portion supporting the bottom surface of one battery cell, and
a second portion supporting the first main surface of another, adjacent battery cell.

5. The battery pack as claimed in claim 4, wherein the at least one cooling channel is between the first portion and the second portion of the first step.

6. The battery pack as claimed in claim 1, wherein the at least one cooling channel includes a plurality of cooling channels respectively in each of the first steps.

7. The battery pack as claimed in claim 6, wherein the plurality of cooling channels are connected in parallel such that inlets and outlets of respective cooling channels are fluidly connected to each other.

8. The battery pack as claimed in claim 7, wherein the inlets of the plurality of cooling channels are connected to a cooling medium supply pipe through a distributor.

9. The battery pack as claimed in claim 8, wherein:
the cooling medium supply pipe forms a flow path that directs a cooling medium in a direction opposite to a flow direction of the cooling medium in the plurality of cooling channels, and
the cooling medium supplied from the cooling medium supply pipe is distributed to each of the cooling channels as the flow direction is changed in the distributor.

10. The battery pack as claimed in claim 8, wherein the first holder plate further includes the cooling medium supply pipe and a second hollow portion surrounding the cooling medium supply pipe.

11. The battery pack as claimed in claim 7, wherein the outlets of the plurality of cooling channels are connected to a main outlet through which a cooling medium is discharged through a collector connected to the outlets of the plurality of cooling channels.

12. The battery pack as claimed in claim 1, wherein:
each of the battery cells further includes a vent for relieving inner pressure of the battery cells, and
the second holder plate further includes a vent hole in the second steps at a position corresponding to the vent of the battery cell.

13. The battery pack as claimed in claim 12, wherein:
each battery cell includes:
a terminal surface including a terminal;
a bottom surface opposite to the terminal surface;
a first main surface and a second main surface, the first and second main surfaces connecting the terminal surface and the bottom surface and each having a first area; and
a pair of side surfaces connecting the terminal surface and the bottom surface, the side surfaces each having a second area that is smaller than the first area, and
the second steps each include:
a first portion supporting the terminal surface of one battery cell, and
a second portion supporting the second main surface of another, adjacent battery cell.

14. The battery pack as claimed in claim 13, wherein the vent hole is in the first portion of the second step.

15. The battery pack as claimed in claim 13, wherein the second steps each further include an accommodation space for receiving exhaust gas discharged through the vent hole, the accommodation space being an inner space of the second step.

16. The battery pack as claimed in claim 15, further comprising at least one exhaust channel fluidly connected to the accommodation space and providing a discharge path for exhaust gas, the at least one exhaust channel extending across a plurality of the accommodation spaces.

17. The battery pack as claimed in claim 16, wherein the at least one exhaust channel includes a first exhaust channel and a second exhaust channel at opposite sides of the plurality of the accommodation spaces.

18. The battery pack as claimed in claim 17, wherein:
the plurality of the accommodation spaces include first and second accommodation spaces arranged alternately along a horizontal direction,
the first accommodation space is fluidly connected to the first exhaust channel, and
the second accommodation space is fluidly connected to the second exhaust channel.

19. The battery pack as claimed in claim 17, further comprising a partition wall between the first and second accommodation spaces and partitioning the first and second accommodation spaces from each other.

20. The battery pack as claimed in claim 19, wherein the partition wall is at one side of the first portion of the second steps, and not at a side of the first portion that includes the vent hole.

21. The battery pack as claimed in claim 19, wherein the partition wall is a hollow structure having an empty inner portion.

22. The battery pack as claimed in claim 19, wherein, in the partition wall, a wall body at a side opposite to a connection hole connecting the accommodation space and the exhaust channel includes a rounded portion.

23. The battery pack as claimed in claim 1, wherein the first and second holder plates are coupled to each other with a fastener configured to fasten the first and second holder plates in directions facing each other with the plurality of battery cells therebetween.

24. The battery pack as claimed in claim 1, wherein the fastener is fastened to the first and second holder plates at positions corresponding to the first vertically protruding edges and the second vertically protruding edges of the plurality of battery cells.

25. The battery pack as claimed in claim 24, wherein the first vertically protruding edges and the second vertically protruding edges of the plurality of battery cells are aligned along the second direction.

26. The battery pack as claimed in claim 23, wherein:
the battery cells are arranged in a plurality of rows such that rows of battery cells each including a plurality of battery cells are spaced parallel to each other,
the first and second holder plates further include a plurality of step portions extending in parallel in a horizontal direction so as to be spaced apart from each other in correspondence with a plurality of rows of battery cells, and a fastening portion formed flat between the adjacent step portions, and
the fastener is fastened to the fastening portion.

27. The battery pack as claimed in claim 26, wherein each of the step portions of the first and second holder plates includes a plurality of repeatedly arranged first and second steps.

* * * * *